UNITED STATES PATENT OFFICE.

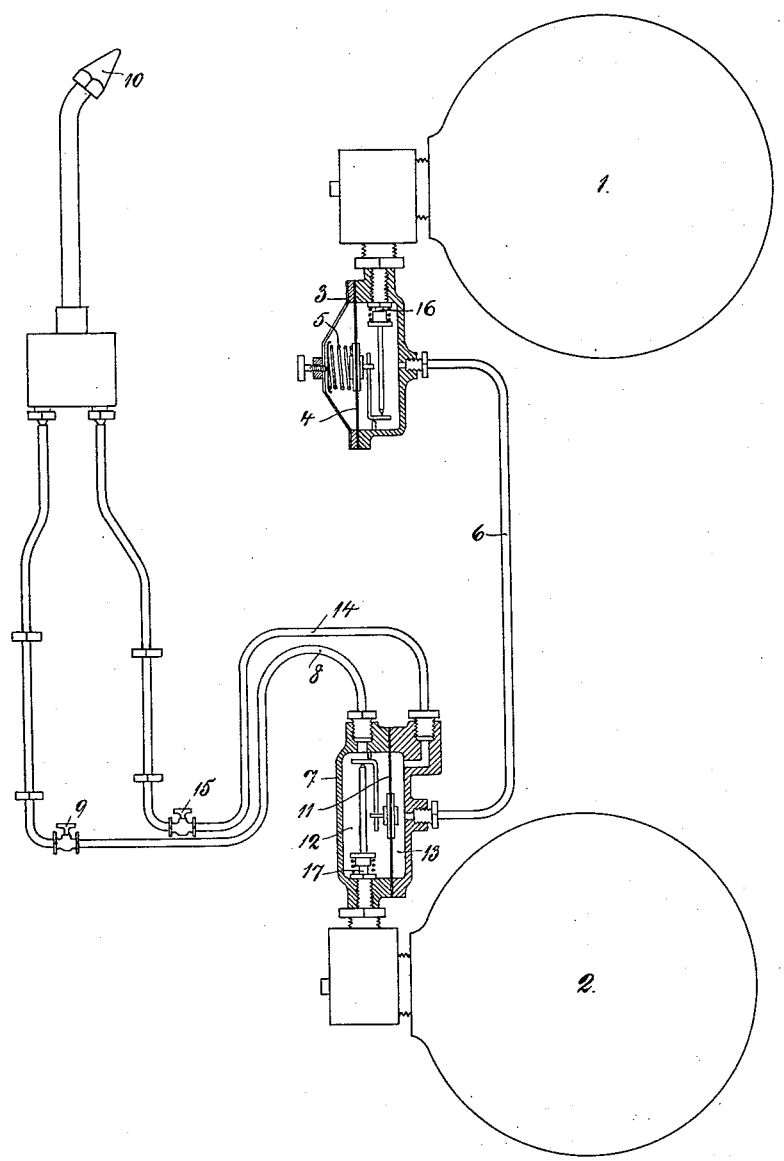

GUSTAF DALÉN, OF SKÄRSÄTRA, LIDINGÖN, STOCKHOLM, SWEDEN.

LIGHTING OR HEATING APPARATUS.

1,213,159. Specification of Letters Patent. Patented Jan. 23, 1917.

Application filed May 2, 1916. Serial No. 94,891.

*To all whom it may concern:*

Be it known that I, GUSTAF DALÉN, a subject of the King of Sweden, residing at Skärsätra, Lidingön, Stockholm, Sweden, have invented new and useful Improvements in Lighting or Heating Apparatus for Gas Mixtures, of which the following is a specification.

The present invention refers to apparatus, which are employed in connection with search light apparatus, welding apparatus, cutting apparatus or the like, in which a gas mixture, say a mixture of oxygen and a gas rich in carbon, such as acetylene, is used for establishing a flame for lighting or heating purposes.

The invention has for its object to automatically maintain a constant proportion between the two gases, contained in the gas mixture.

On the drawing the invention is shown schematically with the pressure governors in section.

1 indicates the upper part of a receiver, containing one of the gases to be employed, say oxygen, under pressure, and 2 indicates a similar receiver, containing the other gas, say acetylene gas, under pressure.

3 indicates a pressure governor, connected with the gas receiver 1, of any suitable or known construction, it being sufficient to describe, that a spring 5 acting upon the diaphragm 4 determines the pressure of the gas, flowing out from the governor through the conduit 6.

7 indicates a second pressure governor, connected with the receiver 2, and from which extends a conduit 8, connected with the burner 10, provided with a cutting off valve 9. The diaphragm 11 of the governor 7 divides the governor in two chambers 12 and 13, of which chamber 12 is connected with the gas receiver 2, whereas chamber 13 is connected with the conduit 6, leading from the pressure governor 3, and also with the conduit 14, which leads to the burner 10 and is provided with a cutting off valve 15.

It will be evident that owing to this construction the two pressure governors 3 and 7 coöperate, so that a variation of the pressure in the governor 3 will cause a corresponding variation of the pressure in the chamber 12 of the governor 7 and thus also in the conduit 8, whereby the proportions of the gases, flowing to the burner 10, always will remain constant. Thus it will be seen that an augmentation of the pressure in the governor 3, which will result in a throttling of the valve 16, will cause the diaphragm 11 to move to the left on the drawing, whereby the valve 17 of the governor 7 will cause an augmented flow of gas from the receiver 2 to chamber 12 and conduit 8 until the diaphragm 11 will move to the right on the drawing, owing to the diminished pressure in chamber 13, caused by the diminished pressure in governor 3, owing to the throttling of the valve 16 above referred to.

If the pressure in the governor 3 will be diminished the operation of the two governors will be the reverse.

It will be observed, that the diaphragm 11 of the governor 7 on its one side is actuated only by the pressure in the governor 3, and on its other side only by the pressure in chamber 12. In said governor 7 no springs are used for governing purposes. Moreover it should be observed that the cutting off valves 15, 9 are placed between the governor 7 and the burner, instead of between the gas receivers 1 and 2 and the governors 3 and 7, as hitherto has been usual in this kind of apparatus, the advantage being that said governors may be placed in close proximity to the gas receivers, enabling the employment of long conduits or tubes between the governor 7 and the burner 10, which thus can be comfortably handled.

The gas conduits 8 and 14 may if desired be connected with a gas mixing chamber, or the burner pipe itself may serve as mixing chamber.

Having now described my invention what I claim and desire to secure by Letters Patent is:

1. In apparatus for lighting or heating purposes a receiver for storing a gas under pressure, a gas pressure governor, connected with said gas receiver, a second gas pressure governor, a second receiver connected therewith for storing a gas under pressure, adapted to be mixed with the aforesaid gas, and means for making the pressure in said second governor dependent of the pressure in the first mentioned governor.

2. In apparatus for lighting or heating purposes a receiver for storing a gas under pressure, a gas pressure governor, connected with said receiver, a second gas pressure governor, a second receiver connected therewith for storing a gas under pressure, adapted to be mixed with the aforesaid gas, and a gas connection between said governors, adapted to make the pressure in said second governor dependent of the pressure in the first mentioned governor.

3. In apparatus for lighting or heating purposes, a receiver for storing a gas under pressure, a gas pressure governor, connected with said receiver, a second gas pressure governor, a second receiver connected therewith for storing a gas under pressure, adapted to be mixed with the aforesaid gas, the gas pressure in said second gas pressure governor being balanced by the pressure in the first mentioned governor only.

4. In apparatus for lighting or heating purposes, a receiver for storing a gas under pressure, a gas pressure governor, connected with said receiver, a second gas pressure governor, a second receiver connected therewith for storing a gas under pressure, the gas pressure in said second governor being balanced by the pressure in the first mentioned governor only, leading to a burner, and shutting off valves, inserted in said outlets at a place between the burner and the governors.

In testimony whereof I have signed my name to this specification in the presence of two subscribing witnesses.

GUSTAF DALÉN.

Witnesses:
WALDEMAR BOMAN,
A. BIÖRCK.